US012525076B2

(12) United States Patent
Sakurai et al.

(10) Patent No.: US 12,525,076 B2
(45) Date of Patent: Jan. 13, 2026

(54) COMMUNICATION DEVICE

(71) Applicant: TOYOTA JIDOSHA KABUSHIKI KAISHA, Toyota (JP)

(72) Inventors: Hiroaki Sakurai, Nagoya (JP); Kunito Takahashi, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 83 days.

(21) Appl. No.: 18/437,621

(22) Filed: Feb. 9, 2024

(65) Prior Publication Data

US 2024/0321023 A1 Sep. 26, 2024

(30) Foreign Application Priority Data

Mar. 23, 2023 (JP) ................................ 2023-046478

(51) Int. Cl.
*G07C 5/08* (2006.01)

(52) U.S. Cl.
CPC ......... *G07C 5/0833* (2013.01); *G07C 5/0808* (2013.01)

(58) Field of Classification Search
CPC .. G07C 5/0833; G07C 5/0808; H04R 29/001; H04R 29/004
See application file for complete search history.

(56) References Cited

U.S. PATENT DOCUMENTS

2020/0411035 A1* 12/2020 Perkal ...................... H04R 3/04

FOREIGN PATENT DOCUMENTS

JP 2002288772 A * 10/2002

OTHER PUBLICATIONS

JP 05049096 A (Year: 1993).*

* cited by examiner

*Primary Examiner* — Aaron L Troost
(74) *Attorney, Agent, or Firm* — SoraIP, Inc.

(57) ABSTRACT

A communication device includes a D/A converter that generates an audio signal that is output as audio from a speaker, and an A/D converter that generates an input audio signal from audio collected by a microphone. The communication device generates a diagnostic audio signal that is output as diagnostic audio at a frequency that is outside of human hearing range. When the diagnostic audio is output from the speaker, the communication device generates an input audio signal based on the audio collected by the microphone and determines whether an abnormality has occurred based on a comparison of the original diagnostic audio signal with the input audio signal generated based on the diagnostic audio collected by the microphone.

2 Claims, 3 Drawing Sheets

COMMUNICATION DEVICE

CROSS-REFERENCE TO RELATED APPLICATION

This application claims priority to Japanese Patent Application No. 2023-046478 filed on Mar. 23, 2023 incorporated herein by reference in its entirety.

BACKGROUND

1. Technical Field

The present disclosure relates to a communication device provided in a vehicle.

2. Description of Related Art

Japanese Unexamined Patent Application Publication No. 2002-288772 (JP 2002-288772 A) discloses an emergency information notification device provided in a vehicle. The emergency information notification device has a function of transmitting an audio signal related to audio collected by a microphone to a center outside the vehicle, and a function of generating audio based on an audio signal transmitted from the center from a speaker. Further, when the emergency information notification device generates audio based on a predetermined audio signal from a speaker at startup, the emergency information notification device causes the microphone to collect the sound. Then, the emergency information notification device diagnoses whether an abnormality has occurred by comparing a loopback signal and the predetermined audio signal, the loopback signal being an audio signal related to audio collected by the microphone.

SUMMARY

When making the above-described diagnosis, an occupant may feel uncomfortable when the occupant hears audio based on the predetermined audio signal.

An aspect of the present disclosure provides a communication device mounted in a vehicle including a speaker and a microphone provided inside a vehicle cabin to communicate with a center outside the vehicle.

The communication device includes:

an output unit that generates audio based on an audio signal from the speaker when the audio signal is input;

an input unit into which an input audio signal is input, the input audio signal being an audio signal related to audio collected by the microphone;

an audio signal generation unit that generates, as a diagnostic audio signal, an audio signal related to audio at a frequency not included in an audible range that is a frequency range of sound that is hearable to humans; and a diagnosis unit that diagnoses whether an abnormality has occurred by comparing the input audio signal related to audio collected by the microphone when the speaker generates audio based on the diagnostic audio signal generated by the audio signal generation unit and the diagnostic audio signal.

The above communication device achieves the effect of being able to make a diagnosis without making an occupant of the vehicle feel uncomfortable.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
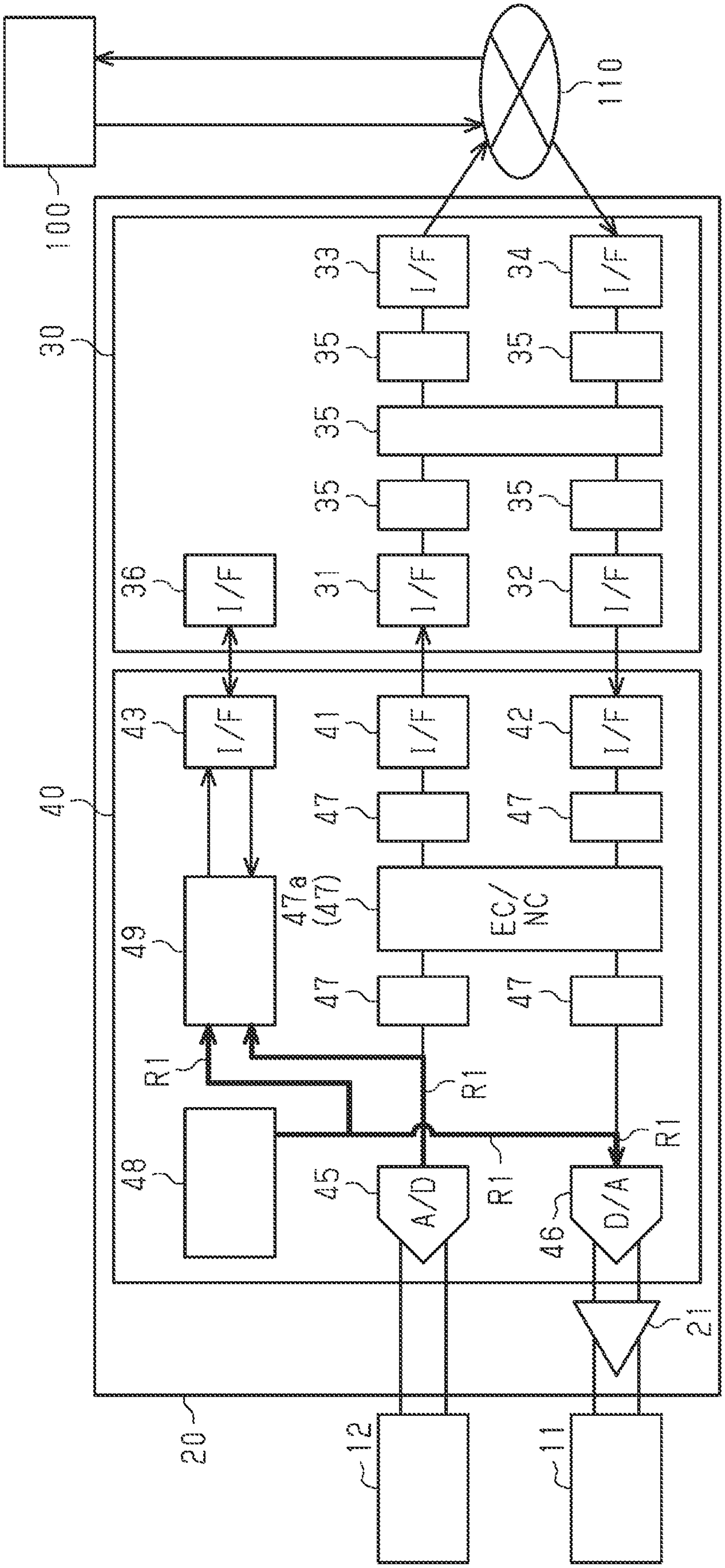
FIG. 1 is a schematic diagram showing an outline of a communication device according to an embodiment.
Figure 2:
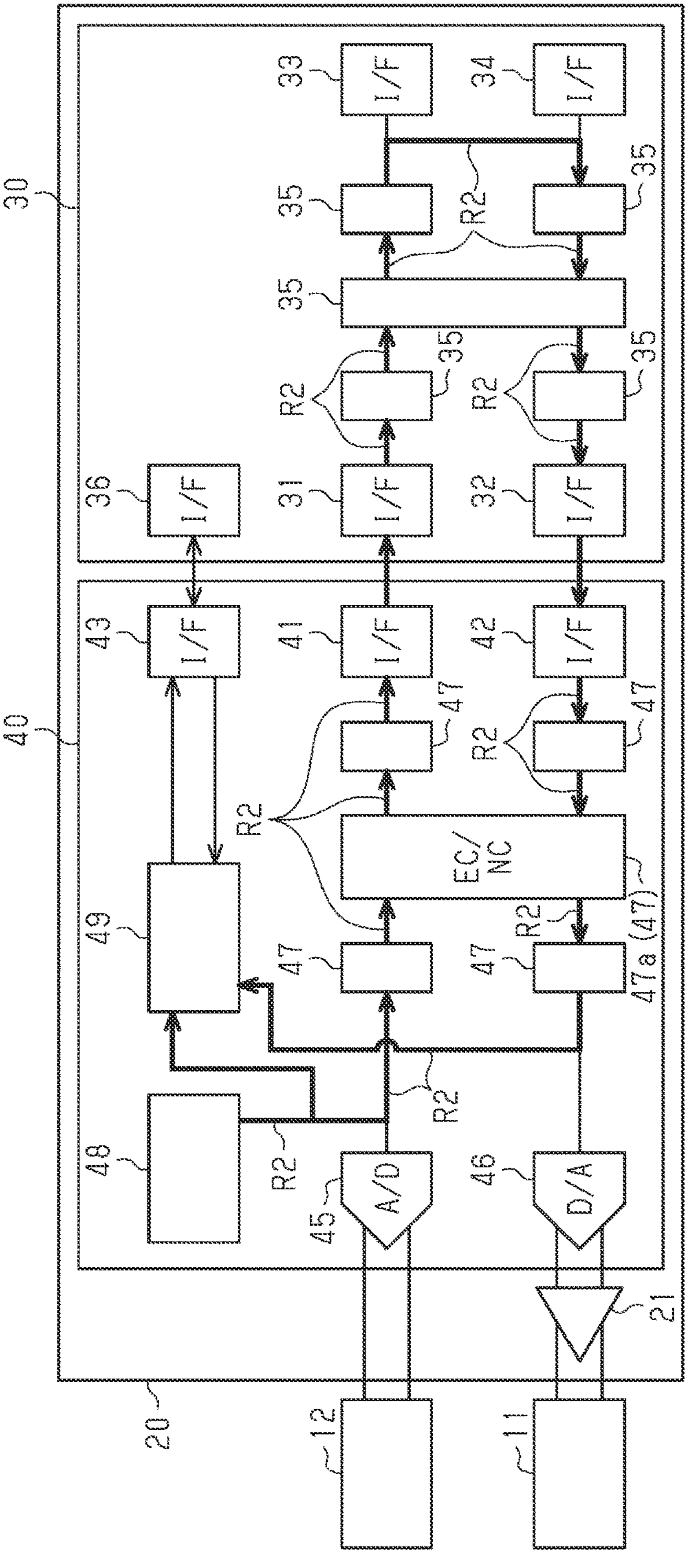
FIG. 2 is a schematic diagram showing an outline of a communication device according to an embodiment.

Hereinafter, one embodiment of a communication device will be described according to FIGS. 1 to 3. FIGS. 1 and 2 illustrate a communication device 20 installed in a vehicle, and a speaker 11 and a microphone 12 installed in the vehicle cabin of the vehicle. The speaker 11 generates audio within the vehicle cabin based on the audio signal input from the communication device 20. When the microphone 12 collects the sound inside the vehicle cabin, it outputs an audio signal, which is a signal related to the sound, to the communication device 20. The microphone 12 is installed at a position where it can collect the sound generated from the speaker 11.

Communication Device

The communication device 20 is a device that communicates with a center 100 installed outside the vehicle via a wireless LAN 110. For example, when a vehicle occupant and an operator outside the vehicle have a conversation, when the speaker 11 collects the voice uttered by the vehicle occupant, the communication device 20 transmits an audio signal related to the voice collected by the speaker 11 to the center 100. When the communication device 20 receives an audio signal related to the voice uttered by the operator, the communication device 20 causes the speaker 11 to generate audio based on the received audio signal.

The communication device 20 includes a main control device 30, an audio input/output device 40, and an amplifier 21. The audio input/output device 40 outputs an audio signal to the amplifier 21 when the speaker 11 generates audio. The amplifier 21 amplifies the input audio signal and outputs it to the speaker 11. Thereby, the speaker 11 can generate audio based on the audio signal output by the audio input/output device 40.

Although not shown, the communication device 20 also includes control devices other than the main control device 30 and the audio input/output device 40. The audio input/output device 40 and other control devices are each configured to be able to send and receive information to and from the main control device 30.

Main Control Device

The main control device 30 has a first interface for transmitting and receiving information with the audio input/output device 40 and a second interface for communicating with the center 100. The main control device 30 has, as a first interface, a first reception interface 31 that receives audio signals from the audio input/output device 40 and a first transmission interface 32 that transmits the audio signal to the audio input/output device 40. The main control device 30 has, as a second interface, a second transmission interface 33 that transmits a signal to the center 100, and a second reception interface 34 that receives the signal transmitted by the center 100.

Furthermore, the main control device 30 includes a plurality of functional units 35 through which signals are input and output when exchanging signals between the first interface and the second interface. The plurality of functional units 35 include, for example, a functional unit that adjusts the volume and a switch.

Note that the main control device 30 also has a third interface 36 for transmitting and receiving information to and from the audio input/output device 40. As will be described in detail later, the audio input/output device 40 executes a diagnostic process to diagnose whether or not an abnormality has occurred. When the audio input/output device 40 performs the diagnostic processing, the audio input/output device 40 transmits diagnostic information that is information regarding the diagnosis result to the main control device 30. At this time, the main control device 30 receives diagnostic information via the third interface 36.

Audio Input/Output Device

The audio input/output device 40 has a transmission interface 41 that transmits audio signals to the main control device 30 and a receiving interface 42 that receives audio signals from the main control device 30. The audio input/output device 40 also includes a diagnostic interface 43 that transmits the diagnostic information to the third interface 36 of the main control device 30.

The audio input/output device 40 includes an A/D converter 45 and a D/A converter 46. An audio signal related to the audio collected by the microphone 12 is input to the A/D converter 45. In other words, the A/D converter 45 corresponds to an "input unit". When the audio signal input from the microphone 12 to the audio input/output device 40 is an input audio signal, the input audio signal input from the microphone 12 to the A/D converter 45 is an analog signal. The A/D converter 45 converts the input audio signal input from the microphone 12 from an analog signal to a digital signal and outputs the digital signal.

D/A converter 46 outputs the audio signal to amplifier 21. In other words, the D/A converter 46 corresponds to an "output unit" that causes the speaker 11 to generate audio based on the audio signal. When the audio signal input to the D/A converter 46 is an output audio signal, the output audio signal input to the D/A converter 46 is a digital signal. The D/A converter 46 converts the input output audio signal from a digital signal to an analog signal and outputs it to the amplifier 21.

The audio input/output device 40 has a plurality of functional units 47 through which signals are input and output when performing communication processing with the communication device 20. The plurality of functional units 47 include an audio processing unit 47*a*. The audio processing unit 47*a* has an echo canceller function and a noise canceller function. The echo canceller function is a function that removes acoustic echo components from the audio signal received from the communication device 20. The noise canceller function is a function that removes noise components from the input audio signal output from the A/D converter 45. Note that the functional units 47 other than the audio processing unit 47*a* include, for example, a functional unit that adjusts the volume and a switch.

The audio input/output device 40 includes an audio signal generation unit 48 and a diagnosis unit 49. The audio signal generation unit 48 generates an audio signal related to audio having a frequency not included in the audible range as a diagnostic audio signal. The audible range is the frequency range of sounds that humans can hear. Here, the frequency range from 20 Hz to 15 kHz is defined as the audible range.

In this embodiment, the audio signal generation unit 48 generates an audio signal related to audio at a higher frequency than the audible range, as the diagnostic audio signal. For example, the audio signal generation unit 48 generates an audio signal related to audio having a frequency between 18 kHz and 20 kHz as a diagnostic audio signal.

The diagnosis unit 49 uses the diagnostic audio signal to diagnose whether or not an abnormality has occurred. The term "abnormality" used herein refers to an abnormality that makes it impossible for a vehicle occupant to have a conversation with an operator outside the vehicle, or an abnormality that makes it difficult to have a conversation.

In this embodiment, the diagnosis unit 49 performs a first diagnosis process and a second diagnosis process. The first diagnostic process is a process for diagnosing whether it is possible to output sound from the speaker 11 and whether or not the audio input/output device 40 can acquire an input audio signal related to the sound collected by the microphone 12. Therefore, the diagnosis unit 49 can diagnose whether an abnormality has occurred in any of the amplifier 21, the microphone 12, the speaker 11, and a part of the audio signal generation unit 48 in the first diagnostic process. The "part of the audio signal generation unit 48" herein includes the A/D converter 45 and the D/A converter 46.

The second diagnostic process is a process for diagnosing whether the audio signal can be transmitted to the center 100 and whether the audio signal received from the center 100 can be input to the D/A converter 46. Therefore, in the second diagnosis process, the diagnosis unit 49 can diagnose whether an abnormality has occurred in any of the multiple functional units 47 of the audio input/output device 40 and the multiple functional units 35 of the main control device 30.

Diagnostic Processing

Figure 3:
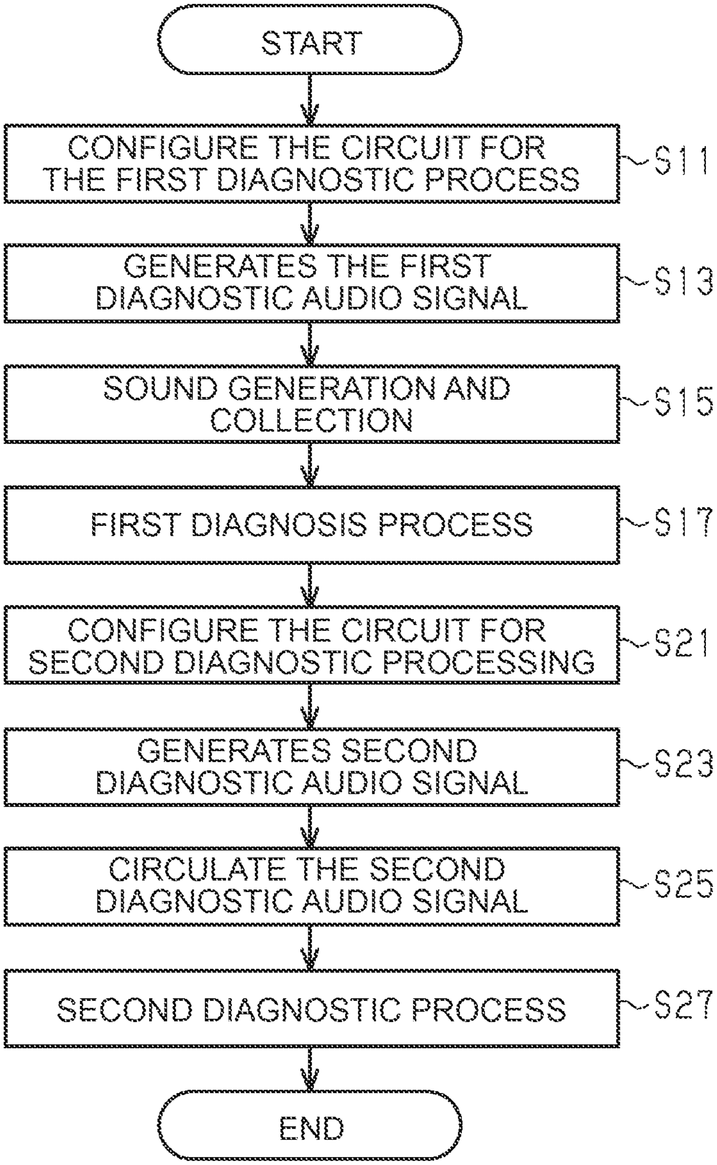
FIG. 3 is a flowchart showing the flow of a series of processes executed by the audio input/output device included in the communication device of FIG. 1.

With reference to FIGS. 1, 2, and 3, the flow of a series of processes when performing the first diagnosis process and the second diagnosis process will be described. FIG. 3 shows a flowchart showing this series of processing. The communication device 20 executes a series of processes shown in FIG. 3 when the driving switch of the vehicle is turned on. An example of an operation switch is an ignition switch.

As shown in FIG. 3, in S11, the communication device 20 sets the communication circuit in the audio input/output device 40 as a circuit for the first diagnosis process. An example of a circuit for the first diagnostic process is indicated by an arrow R1 in FIG. 1. That is, the communication device 20 sets the communication circuit so as to satisfy (A1) and (A2) below.

(A1) The diagnostic audio signal generated by the audio signal generation unit 48 is input to the D/A converter 46 and the diagnosis unit 49.

(A2) The input audio signal output by the A/D converter 45 is input to the diagnosis unit 49.

In the next step S13, the audio signal generation unit 48 generates a first diagnostic audio signal, which is an example of a diagnostic audio signal. Thereby, the first diagnostic audio signal is output to the D/A converter 46 and the diagnosis unit 49.

In subsequent S15, the D/A converter 46 causes the speaker 11 to generate audio based on the first diagnostic audio signal. At this time, the A/D converter 45 converts an input audio signal related to the audio collected by the microphone 12 when the audio is generated from the speaker 11 into a digital signal, and outputs the digital signal to the diagnosis unit 49.

Then, in S17, the diagnosis unit 49 compares the input audio signal obtained from the A/D converter 45 and the first diagnostic audio signal obtained from the audio signal generation unit 48. At this time, if the diagnosis unit 49 determines that the period of the waveform of the input audio signal and the period of the waveform of the first diagnostic audio signal are the same, it diagnoses that no abnormality has occurred. On the other hand, if the diagnosis unit 49 determines that the period of the waveform of the input audio signal is not the same as the period of the waveform of the first diagnostic audio signal, it diagnoses that an abnormality has occurred. The diagnosis unit 49 causes the diagnostic interface 43 to transmit diagnostic information indicating the diagnostic results of the first diagnostic process to the main control device 30. When the communication device 20 finishes the first diagnosis process, the process moves to S21.

In S21, the communication device 20 sets the communication circuit within the communication device 20 as a circuit for second diagnostic processing. An example of a circuit for second diagnostic processing is indicated by arrow R2 in FIG. 2. That is, the communication device 20 sets the communication circuit so as to satisfy the following (B1), (B2), and (B3).

(B1) The diagnostic audio signal generated by the audio signal generation unit 48 is transmitted to the main control device 30 via the functional unit 47 of the audio input/output device 40 and the transmission interface 41.

(B2) After the diagnostic audio signal received by the main control device 30 via the first reception interface 31 passes through the plurality of functional units 35 of the main control device 30, the diagnostic audio signal is transmitted via the first transmission interface 32 to the input/output device 40.

(B3) The diagnostic audio signal received by the audio input/output device 40 via the receiving interface 42 is input to the diagnosis unit 49 after passing through the plurality of functional units 47.

In the next step S23, the audio signal generation unit 48 generates a second diagnostic audio signal, which is an example of a diagnostic audio signal. The second diagnostic audio signal may be the same audio signal as the first diagnostic audio signal, or may be a different audio signal from the first diagnostic audio signal. Then, the second diagnostic audio signal is output to the diagnosis unit 49 and the functional unit 47.

In subsequent S25, the communication device 20 circulates the second diagnostic audio signal within the communication device 20, as described in (B1), (B2), and (B3) above. The communication device 20 then moves the process to S27.

In S27, the diagnosis unit 49 compares the acquired signal, which is the signal acquired through the process of S25, with the second diagnostic audio signal acquired from the audio signal generation unit 48. At this time, if the diagnosis unit 49 determines that the period of the waveform of the acquired signal and the period of the waveform of the second diagnostic audio signal are the same, it diagnoses that no abnormality has occurred. On the other hand, if the diagnosis unit 49 determines that the period of the waveform of the acquired signal is not the same as the period of the waveform of the second diagnostic audio signal, it diagnoses that an abnormality has occurred. The diagnosis unit 49 causes the diagnostic interface 43 to transmit diagnostic information indicating the diagnostic results of the second diagnostic process to the main control device 30. When the communication device 20 ends the second diagnosis process, it ends the series of processes shown in FIG. 3.

Actions and Effects of this Embodiment (1) The first diagnostic audio signal used in the first diagnostic process is an audio signal related to audio having a frequency that is not included in the audible range. Therefore, even if the speaker 11 generates sound based on the first diagnostic audio signal, it is difficult for the occupants of the vehicle to notice that the speaker 11 is generating the sound. Therefore, the communication device 20 can perform the first diagnostic process without causing discomfort to the occupant.

(2) In order to generate sound at a frequency lower than the audible range from a speaker, it is necessary to install a relatively high-performance and large-sized speaker in the vehicle. In this regard, when executing the first diagnostic process, the communication device 20 causes the speaker 11 to generate sound at a higher frequency than the audible range. Therefore, the communication device 20 has high performance and does not require installing a large speaker in the vehicle.

(3) The second diagnostic process is also executed in the communication device 20. Thereby, the diagnosis unit 49 can diagnose whether the communication device 20 can communicate with the center via the wireless LAN 110.

Change Example

The above embodiment can be modified and implemented as follows. The above embodiments and the following modifications can be combined with each other within a technically consistent range.

If the diagnosis unit 49 executes the first diagnostic process, it is not essential for the diagnosis unit 49 to execute the second diagnostic process.

The first diagnostic audio signal may be an audio signal regarding audio at a frequency outside the range of 18 kHz to 20 kHz, as long as it is an audio signal regarding audio at a higher frequency than the audible range. The second diagnostic audio signal is also similar to the first diagnostic audio signal.

The first diagnostic audio signal may be an audio signal related to audio at a lower frequency than the audible range. The second diagnostic audio signal is also similar to the first diagnostic audio signal.

The first diagnostic process and the second diagnostic process may be executed at a time other than when the vehicle is started, which is when the driving switch of the vehicle is turned on.

The audio input/output device 40 is not limited to one that includes a CPU and a ROM and executes software processing. That is, the audio input/output device 40 may have any of the following configurations (a), (b), and (c).

(a) The audio input/output device 40 includes one or more processors that execute various processes according to computer programs. The processor includes a CPU and memory such as RAM and ROM. The memory stores program code or instructions configured to cause the CPU to perform processes. Memory, or computer-readable media, includes any available media that can be accessed by a general purpose or special purpose computer.

(b) The audio input/output device 40 includes one or more dedicated hardware circuits that execute various processes. Dedicated hardware circuits may include, for example, application specific integrated circuits, i.e. ASICs or FPGAs. Note that ASIC is an abbreviation for "Application Specific Integrated Circuit," and FPGA is an abbreviation for "Field Programmable Gate Array."

(c) The audio input/output device 40 includes a processor that executes some of the various processes according to a computer program, and a dedicated hardware circuit that executes the remaining of the various processes.

What is claimed is:

1. A communication device mounted in a vehicle including a speaker and a microphone provided inside a vehicle cabin to communicate with a center outside the vehicle, the communication device comprising:

first circuitry that generates audio from the speaker based on input of an audio signal;

second circuitry into which an input audio signal is input, the input audio signal relating to audio collected by the microphone;

third circuitry that generates a diagnostic audio signal relating to audio at a frequency outside of human hearing range; and fourth circuitry that compares the input audio signal relating to audio collected by the microphone when the speaker generates audio based on the diagnostic audio signal generated with the diagnostic audio signal to diagnose whether an abnormality has occurred, wherein:

the communication device includes a plurality of functional units through which signals are input and output when communicating with the center; and the fourth circuitry is further configured to sequentially input the diagnostic audio signal generated by the third circuitry to the functional units, and diagnose whether the abnormality has occurred by comparing a signal that has passed through all of the functional units with the diagnostic audio signal.

2. The communication device according to claim 1, wherein the audio generated based on the diagnostic audio signal is at a frequency above the human hearing range.

* * * * *